Patented Aug. 30, 1927.

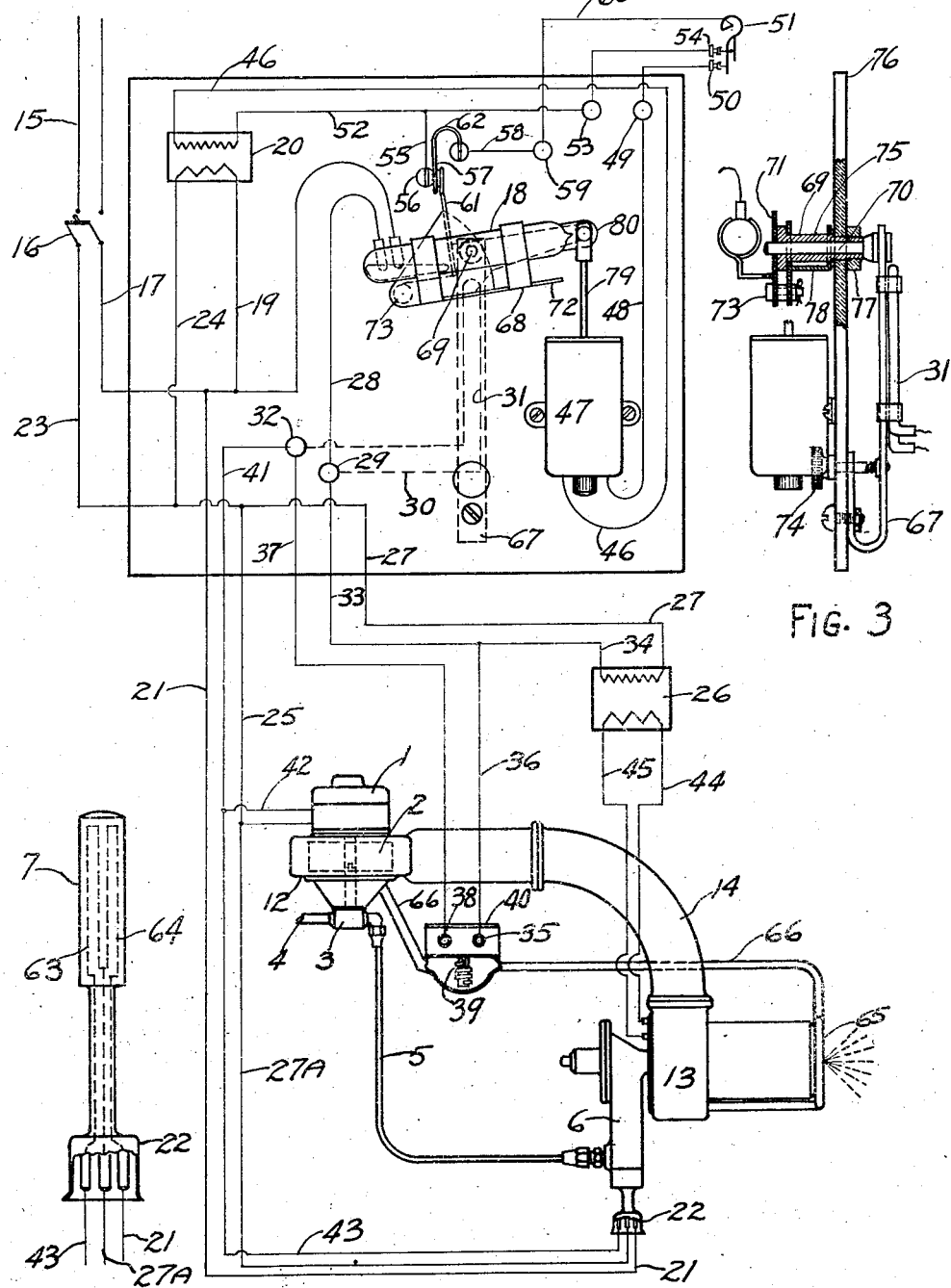

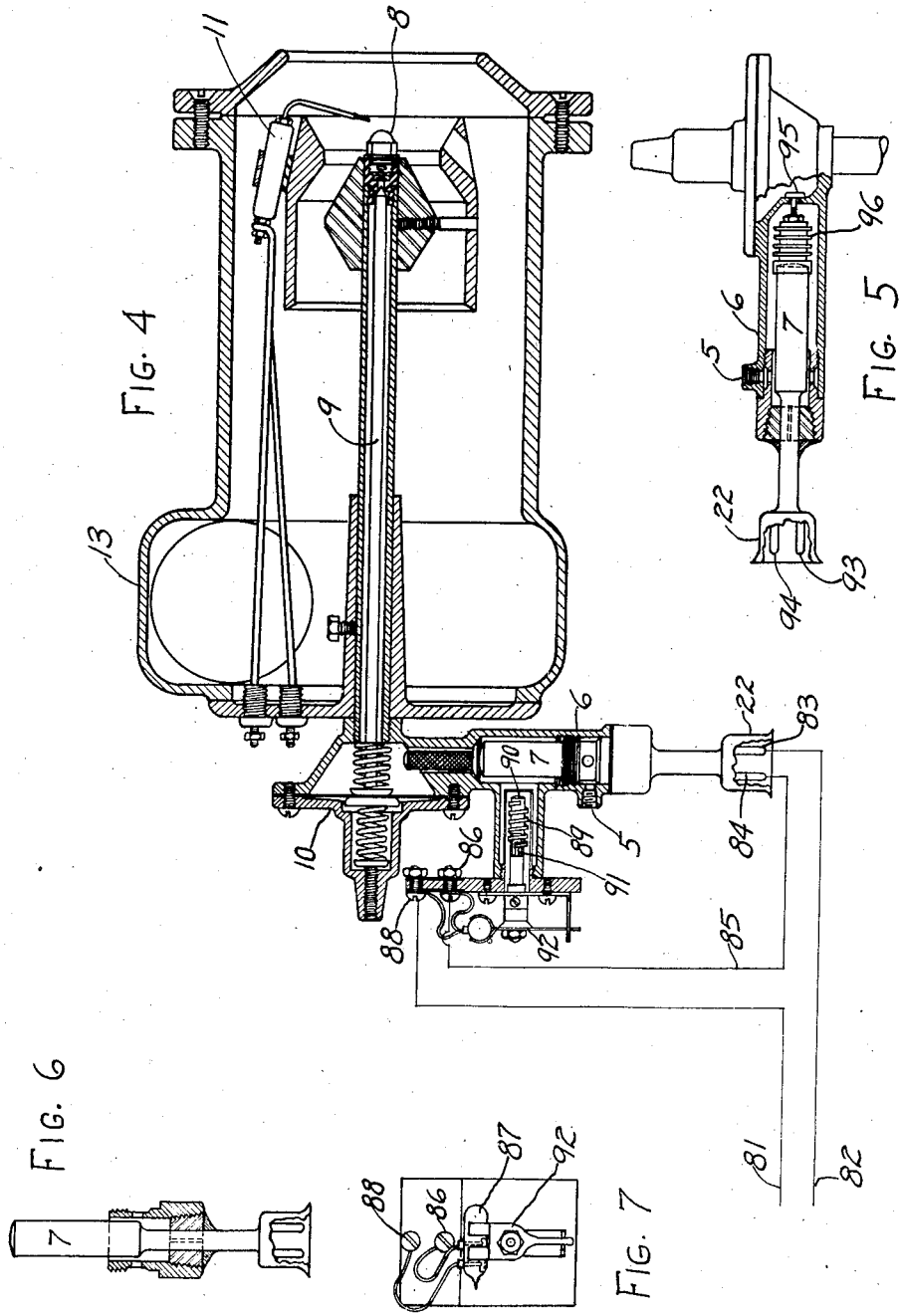

1,640,729

UNITED STATES PATENT OFFICE.

LEWIS L. SCOTT, OF ST. LOUIS, MISSOURI.

OIL-BURNING SYSTEM.

Application filed September 21, 1925. Serial No. 57,706.

This invention relates to the spraying of liquids, which will not readily spray at normal temperatures. My invention is shown here applied to an oil burner, athough the invention in its broadest sense is not limited in application to oil burners.

The viscosity of a liquid changes materially with temperature change; for example, an oil which has a viscosity of 58 minutes at 70° F. has shown a viscosity of 60 seconds at 180° F.

I have found that where oil is used for heating homes, and where small rates of fuel are used, for example, around 1½ gallons per hour, it is very difficult to spray an oil which has a viscosity of say 160 seconds. I have also found that by applying a small amount of heat near the spray nozzle, I can spray an oil which would not spray at normal temperatures. For example, I can take an oil that will readily flow through a pipe at normal temperatures and which can easily be pumped to and through the spray nozzle and instead of coming out of the nozzle in the form of a spray, it will come out in a small round stream even though a high pressure is used to force the oil through the nozzle. I have found that by maintaining a temperature on the oil at the spray nozzle of from 130° F. to 160° F. (which is well below the flash point of the oil and well below the cracking point), it can be easily sprayed. I am aware of the fact that it is old to preheat oil in order to get it to flow through a pipe or so that it can be pumped, and that preheating devices have been used in tanks containing oil. Where oil is used for heating homes, the oil burner is automatically turned on and off according to room temperature and at night the oil burner is usually off for several hours, during which time the oil around the spray nozzle and in the pipe lines would get cold, and unless some means were used to maintain a temperature of around 140° F. on the oil around the spray nozzle so that it would be in condition to readily spray, it would be necessary to use an oil that is much lighter and much more expensive than the oil which cannot be readily sprayed at normal temperatures.

The object of my invention is to provide a method of spraying a liquid, which is not readily sprayed at normal temperatures, which consists of applying heat to the liquid near the spraying device and maintaining a temperature on said liquid that will permit the spraying of the liquid and yet will not be high enough to vaporize said liquid.

A further object of my invention is to automatically maintain approximately the same temperature on the liquid at the spray nozzle, whether the liquid is flowing through the nozzle or is at rest.

In the present case the invention is embodied in an oil burning combustion system and in the accompanying drawings illustrating such embodiment.

Figure 1 is a diagrammatic drawing showing my invention applied to an oil burning system.

Figure 2 is a plan view of an electric heating element which I use for heating the oil and which is shown in connection with the oil burning system shown in Figure 1.

Figure 3 is a side view, shown partly in section, of the automatic control switch and safety switch used in my oil burning system.

Figure 4 is a sectional view of the spray nozzle and a modification of my heating device applied thereto, the spray nozzle and accompanying parts shown here are more fully shown in my application No. 51,979, filed August 24th, 1925, domestic oil burner.

Figure 5 is a part sectional view of my nozzle head and electric heating element showing a modification of my invention.

Figure 6 is a sectional view of the mounting which holds my electric heating element.

Figure 7 is an end view of a mercury control switch which is shown in Figure 4.

Referring now to the drawings, the numeral 1 indicates (see Figure 1), an electric motor which operates a fan wheel 2 and fuel pump 3. The intake pipe 4 of the fuel pump runs to a tank not shown. Oil from pump 3 is discharged through pipe 5 and runs to the nozzle head 6 and around the electric heating element head 7 and into and through the spray nozzle 8, (see Figure 4). The valve 9 is controlled by the diaphragm 10 according to fuel pressure on said diaphragm as more fully described in my application as above referred to. Spark plugs, indicated by the numeral 11, are used for igniting the sprayed oil and air to promote combustion is furnished by the blower wheel 2 which is mounted in the housing 12 and which passes to the air receiver 13 through the pipe 14, as more fully described in my application before referred to. The numeral 15 indicates the main power wires, (see Figure 1), running to a source of electric power. 16 is a switch in the main power line. The wire 17, which is connected to one side of switch 16, runs to one of the contact points on the mercury switch 18. The wire 19 is connected to 17 and runs to one side of primary coil of transformer 20, the purpose of which will be later described. The wire 21 also connects to wire 17 and runs to one of the terminals of electric heater 22, (see Figure 1), which will be described later. The wire 23 which is connected to switch 16 runs to transformer 20 by wire 24, to motor 1, by wire 25, to spark transformer 26, by wire 27 and to one of terminals of heater 22 by wire 27ᴬ. The wire 28 connects to one of the terminals of the mercury switch 18 and runs to the terminal post 29 and then by wire 30 through a thermostatic heating coil 31 to terminal post 32. The wire 33 connects to post 29 and runs to spark transformer 26 through wire 34 and to terminal 35 of safety switch 40 by wire 36. The wire 37 connects to terminal post 32 and runs to terminal 38 of the safety switch 40. The safety switch 40 consists of a piece of thermostatic metal 39, which, when heated will rotate in one direction and when cooled will rotate in the opposite direction. By referring to Figures 4 and 7, a good idea of a thermostat switch can be had. The thermostatic switch shown in Figures 4 and 7 is used for a different purpose and will be later described. The function of the safety switch 40 will be later described, however, it may be said here that this switch is closed when the thermostatic metal 39 is heated, and open when thermostatic metal 39 is cooled. The wire 41 connects to post 32 and runs to motor 1 by wire 42, and to one of the terminals on electric heater 22 by wire 43. The transformer 26 transforms 110 volts to about 8000 volts which is conducted to the spark plug terminals through wires 44 and 45.

The transformer 20 transforms 110 volts to 18 volts for use in the room thermostat circuit which will now be described. The wire 46 runs to solenoid 47 and then by wire 48 to terminal post 49 and to contact 50 of room thermostat 51. The wire 52 runs from transformer 20 to terminal 53 and then to contact 54 of thermostat 51. The wire 55 connects to wire 52 and runs to contact 56. The contact 57 is in contact with 56 when the mercury switch is in the position shown. The wire 58 runs to terminal post 59 and then by wire 60 to thermostat metal 51. Contact 50 of thermostat 51 closes slightly before contact 54, but current cannot flow to solenoid 47 until contacts 50 and 54 are both made, then solenoid 47 is energized and the mercury switch 18 will assume the position shown in Figure 1, and when in this position, contacts 57 and 56 will be closed by action of arm 61 pressing against the spring 62, so that when the room thermostat 51 starts moving away from contacts 50 and 54, it will break contact 54 first but the solenoid 47 will not be de-energized until contact 50 is broken. This arrangement makes it possible to set the room thermostat so that the solenoid 47 will turn on, say at 70 degrees, and off at say 72 degrees. When solenoid 47 is energized, the contacts of mercury switch 18 will be closed and current will be on transformer 26, on motor 1, and on coil 63 of the electric heater 22. It will be noted by tracing the wiring that coil 64 of the electric heater 22 is on all of the time that main line switch 16 is closed. It will be further noted that the thermostatic heating coil 31 is connected in series with motor 1 as long as the switch in safety 40 is open, which is the case when there is no heat on thermostat 39. When the burner starts normally, the pipe 65 is heated by the oil flame and hot air is sucked over thermostat 39 through pipe 66 which is connected to the suction side of blower wheel 2 so that in about 30 seconds after the burner is started, safety switch 40 is closed and the coil 31 is shunted out of the circuit so that it will not heat the thermostatic strip 67. Should the oil fail to ignite, due to failure of ignition or no oil in oil tank, the thermostat 39 will not be heated and the coil 31 will remain in the circuit with the motor. The thermostatic strip 67 is so set that its top end will move to the right (see Figure 3), in about 2 minutes' time, providing current is flowing through coil 31. The mercury tube 18 is carried by a clip 68 which normally has its pivot at 69. Should the thermal strip 67 move to right, (see Figure 3), due to current remaining in coil 31, the pin 70 will be withdrawn so that the arm 71 of the clip 68 will no longer be held as a pivot around the center of pin 70 and the mercury tube will drop down until the arm 72 rests on the solenoid and the circuit through the mercury tube will be open although there may still be current on solenoid 47. When the mercury tube drops down its pivot will be at 73. All circuits closed by the mercury tube 18 will remain open until it has been manually reset. The timing of the thermal strip 67 may be changed by the adjustment screw 74. It will be noted that the stud 75 is secured to board 76 by nut 77 and that clip 78, which is connected to armature 79 of solenoid 47 by arm 80, is pivoted on stud 75 which is on the same center as pin 70.

From the above description it will be seen that I have provided an automatic oil burning system having an electric heating coil which is turned on all of the time and which coil is designed to maintain a temperature of from 120° to 190° F. all of the time that the burner is not in operation, so that a heavy oil can be used and sprayed by this system. When the burner is automatically turned on, due to drop in temperature in room in which room thermostat 51 is located, a second heating coil is cut into the circuit which coil is designed to furnish the extra heat required by the flow of oil over the electric heating element so that an approximate even temperature is maintained on the oil at the spray nozzle regardless of whether the burner is operative or inoperative. It will be further seen that I have provided a safety device that will shut the current off of the electric heating coil, which is cut in at the time the burner is turned on, in the event that there is no oil flow. It is obvious that I might use the one heating coil, which is on all of the time, to maintain the oil at spraying temperature during the period that the burner is off and then supply the extra heat required to maintain the spraying temperature when there is an oil flow, by running the oil pipe 5 near the oil flame. I have found that this method is not reliable.

I will now describe the modifications of my invention which I have illustrated in the accompanying drawings. Referring to Figure 4, it will be noted that the electric heater 22 has only two terminals which indicates that it has but a single heating coil. Current for this electric heater is taken from the main power line through wires 81 and 82. The wire 82 connects to terminal 83 and the terminal 84 is connected by wire 85 to terminal 86 of the mercury switch 87. The wire 81 connects to the terminal 88 of the mercury switch 87. It will be seen that when the mercury switch is closed, current will be on the heater 22 and when the switch is open the current will be turned off of said heater. The operation of the mercury switch 87 is controlled by the temperature of the oil or the temperature of the spray nozzle casting. The numeral 89 indicates a piece of thermostatic metal, one end of which is secured to the piece 90 and the other end is secured to the shaft 91, which shaft 91 is adapted to rotate in piece 90. It will be noted that piece 90 is hollow and is partly cut away so that thermostat strip 89 can be attached to shaft 91. The shaft 91 is secured to arm 92, which arm is adapted to hold the mercury switch 87. The thermostatic strip 89 is so designed that the mercury switch will be closed at temperatures below 140° F. and open at temperatures above say 160° F. It will be seen that by this arrangement that I can at all times maintain a spraying temperature on heavy oils. It is, of course, understood that the electric heater 22 is designed to maintain an oil temperature of 160° when the burner is on.

Referring to Figure 5, the electric heater 22 shown has a single heating coil which has terminals 93 and 94 which are connected to wires 25 and 41, respectively, (see Figure 1), when the heater shown in Figure 5 is substituted for the two coil heater shown in Figure 1. By this arrangement it will be seen that when the main mercury control switch 18 is off there will be no current on heater 22 as shown in Figure 5. In other words, heater 22, as shown in Figure 5, is designed to be turned on and off in unison with the motor. With this arrangement it is evident that the oil in the nozzle casting will get cold if the burner is off for any length of time. To prevent the flow of oil through the spray nozzle 8, (see Figure 4), until the oil has reached a temperature at which it will spray, I provide a thermostatically controlled valve 95, which valve is connected to the thermostat 96 mounted on the end of the head 7 of the heater 22, (see Figure 5). The thermostat 96 is designed to keep the valve closed at temperatures below 130° F. and open above 140° F. By this arrangement it will be seen that although the motor 1 starts, there will be a slight delay of the oil going through nozzle 8 due to the few seconds required to heat the oil in nozzle chamber.

I claim:

1. In an automatic oil burning system, which is adapted to burn an oil which is not readily sprayed at normal temperatures, a spraying device and means for causing the oil to be sprayed through said device, an electric heating element located near the spraying device so as to heat the oil in said spraying device and maintain a spraying temperature on the oil during the period that the system is not in operation and an automatic switch for cutting in an additional electric heating unit which is adapted to supply an extra amount of heat to the oil during the period that the system is in operation.

2. In an automatic oil burning system, which is adapted to burn an oil which is not readily sprayed at normal temperatures, a spraying device and means for causing the oil to be sprayed through said device, an electric heating element containing two heating coils, located near the spraying device so as to heat the oil in said spraying device, one of said coils being adapted to maintain a spraying temperature on the oil during the period that the system is not in operation and an automatic switch for cutting in the other heating coil which is adapted to supply an extra amount of heat to the oil during the period that the system is in operation.

In testimony whereof I have hereunto set my hand.

LEWIS L. SCOTT.